US012764414B2

(12) United States Patent
Grimes et al.

(10) Patent No.: US 12,764,414 B2
(45) Date of Patent: Oct. 13, 2026

(54) TRAINING CAMERA POLICY NEURAL NETWORKS THROUGH SELF-PREDICTION

(71) Applicant: GDM Holding LLC, Mountain View, CA (US)

(72) Inventors: Matthew Koichi Grimes, London (GB); Piotr Wojciech Mirowski, London (GB); Joseph Varughese Modayil, Edmonton (CA)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/874,849

(22) PCT Filed: Jun. 15, 2023

(86) PCT No.: PCT/EP2023/066186

§ 371 (c)(1),
(2) Date: Dec. 13, 2024

(87) PCT Pub. No.: WO2023/242377

PCT Pub. Date: Dec. 21, 2023

(65) Prior Publication Data

US 2025/0365502 A1 Nov. 27, 2025

Related U.S. Application Data

(60) Provisional application No. 63/352,633, filed on Jun. 15, 2022.

(51) Int. Cl.

*H04N 23/60* (2023.01)
*B25J 9/16* (2006.01)
*B25J 13/08* (2006.01)
*H04N 23/695* (2023.01)
*H04N 23/90* (2023.01)

(52) U.S. Cl.

CPC .............. *H04N 23/64* (2023.01); *B25J 9/161* (2013.01); *B25J 9/163* (2013.01); *B25J 9/1697* (2013.01); *B25J 13/08* (2013.01); *H04N 23/695* (2023.01); *H04N 23/90* (2023.01)

(58) Field of Classification Search

CPC .......... B25J 9/161; B25J 9/163; B25J 9/1697; B25J 13/08; G06N 3/0895; G06N 3/092; G06N 3/045; G06N 3/006; H04N 23/64; H04N 23/695; H04N 23/90

USPC .......................................................... 348/159

See application file for complete search history.

(56) References Cited

U.S. PATENT DOCUMENTS

2020/0061811 A1* 2/2020 Iqbal .................... G06N 3/0499
2020/0151446 A1* 5/2020 Versace .................. G06N 3/049
2020/0322528 A1* 10/2020 Guzman .............. G06V 40/166

OTHER PUBLICATIONS

Asada et al., "Purposive behavior acquisition for a real robot by vision-based reinforcement learning," Machine Learning, May 1996, 23(2):279-303.

(Continued)

*Primary Examiner* — Hung Q Dang
*Assistant Examiner* — Nienru Yang
(74) *Attorney, Agent, or Firm* — Fish & Richardson P.C.

(57) ABSTRACT

Methods, systems, and apparatus, including computer programs encoded on a computer storage medium, for training a camera policy neural network.

24 Claims, 5 Drawing Sheets

(56) References Cited

OTHER PUBLICATIONS

Barth-Maron et al., "Distributed Distributional Deterministic Policy Gradients," Paper, Presented at the Proceedings of the International Conference on Learning Representations, Vancouver, Canada, Apr. 30-May 3, 2018, 16 pages.
Barto et al., "Recent advances in hierarchical reinforcement learning," Discrete event dynamic systems, Oct. 2003, 13(1):41-77.
Bellemare et al., "A Distributional Perspective on Reinforcement Learning," Paper, Presented at the Proceedings of the International Conference on Machine Learning, Sydney, Australia, Aug. 6-11, 2017; PMLR, 2017, 70, 10 pages.
Burt et al., "Unsupervised Foveal Vision Neural Architecture with Top-Down Attention," Neural Networks, Sep. 2021, 141, 27 pages (Open Manuscript).
Cheng et al., "Reinforcement Learning of Active Vision for Manipulating Objects under Occlusions," CoRR, Nov. 20, 2018, arXiv:1811.08067v2, 10 pages.
Cheung et al., "Emergence of Foveal Image Sampling from Learning to Attend in Visual Scenes," Paper, Presented at the Proceedings of the International Conference on Learning Representations, Toulon, France, Apr. 24-26, 2017, 9 pages.
Choudhury et al., "Guess What Moves: Unsupervised Video and Image Segmentation by Anticipating Motion," CoRR, Submitted May 2022, arXiv:2205.07844v1, 25 pages.
Deza et al., "Emergent Properties of Foveated Perceptual Systems," CoRR, Submitted Jun. 2020, arXiv:2006.07991v1, 16 pages.
Deza et al., "Foveation induces Robustness to Scene Occlusion in Deep Neural Networks," Journal of Vision, Oct. 2020, 20(11):442 (Abstract).
Dodge, "Five types of eye movement in the horizontal meridian plane of the field of regard," American journal of physiology-legacy content, Jan. 1903, 8(4):307-329.
Espeholt et al., "Impala: Scalable Distributed Deep-RL with Importance Weighted Actor-Learner Architectures," Paper, Presented at the Proceedings of the International Conference on Machine Learning, Stockholm, Sweden, Jul. 10-15, 2018; PMLR, 2018, 80, 10 pages.
Forestier et al., "Intrinsically motivated goal explo-ration processes with automatic curriculum learning," CoRR, Aug. 7, 2017, arXiv:1708.02190, 41 pages.
Gartner et al., "Deep Reinforcement Learning for Active Human Pose Estimation," Paper, Presented at the Proceedings of the Thirty-Fourth AAAI Conference on Artificial Intelligence (AAAI-20), Feb. 7-12, 2020, 34(7):10835-10844.
Grimes et al., "Learning to Look by Self-Prediction," 4th Workshop on Shared Visual Representations in Human and Machine Visual Intelligence, Oct. 18, 2022, 9 pages.
Gualtieri et al., "Learning 6-doF grasping and pick-place using attention focus," Proceedings of the 2nd Conference on Robot Learning, 2018, 87:477-486.
Guo et al., "Machine versus Human Attention in Deep Reinforcement Learning Tasks," Paper, Presented at the 35th Conference on Neural Information Processing Systems, Virtual Event, Dec. 6-14, 2021; Advances in Neural Information Processing Systems, Dec. 2021, 34, 16 pages.
Harris et al., "Foveated Convolutions: Improving Spatial Transformer Networks by Modelling the Retina," Paper, Presented at the First NeurIPS workshop on Shared Visual Representations in Human and Machine Intelligence, Vancouver, Canada, Dec. 13, 2019, 8 pages.
Heess et al., "Emergence of locomotion behaviours in rich environments," CoRR, Jul. 7, 2017, arXiv:1707.02286, 14 pages.
Henaff et al., "Object discovery and representation networks," CoRR, Submitted Mar. 2022, arXiv:2203.08777v1, 26 pages.
Holmgren et al., "Visual pursuit behavior in mice maintains the pursued prey on the retinal region with least optic flow," elife, Oct. 2021, 10:e70838, 34 pages.
Hsu et al., "Vision-based manipulators need to also see from their hands," 10th International Conference on Learning Representations, Jan. 28, 2022, 30 pages.
International Preliminary Report on Patentability in International Appln. No. PCT/EP2023/066186, dated Dec. 10, 2024, 10 pages.
International Search Report and Written Opinion in International Appln. No. PCT/EP2023/066186, dated Oct. 5, 2023, 16 pages.
Jangir et al., "Look closer: Bridging egocentric and third-person views with transformers for robotic manipulation," IEEE Robotics and Automation Letters, Apr. 2022, 7(2):3046-3053.
Karpathy et al., "Curriculum learning for motor skills," Paper, Advances in Artificial Intelligence: 25th Canadian Conference on Artificial Intelligence, Canadian AI 2012, Toronto, ON, Canada, May 28-30, 2012, pp. 325-330.
Kingma et al., "Adam: A Method for Stochastic Optimization," CoRR, Submitted Jan. 2015, arXiv:1412.6980v2, 13 pages.
Kipf et al., "Conditional Object-Centric Learning from Video," CoRR, Submitted Nov. 2021, arXiv:2111.12594v1, 32 pages.
Konidaris et al., "From skills to symbols: Learning symbolic representations for abstract high-level planning," Journal of Artificial Intelligence Research, Jan. 31, 2018, 61:215-289.
Kosiorek et al., "Hierarchical Attentive Recurrent Tracking," Paper, Presented at the 31st Conference on Neural Information Processing Systems, Long Beach, California, Dec. 4-9, 2017; Advances in Neural Information Processing Systems, Dec. 2017, 30, 9 pages.
Land, "Motion and vision: why animals move their eyes," Journal of Comparative Physiology A, Oct. 1999, 185(4):341-352.
LeCun et al., "Gradient-based learning applied to document recognition," Proceedings of the IEEE, Nov. 1998, 86(11):2278-2324.
Liu et al., "Generating attentive goals for prioritized hindsight reinforcement learning," Knowledge-Based Systems, Jun. 2020, 203:106140, 17 pages.
Matthis et al., "Gaze and the control of foot placement when walking in natural terrain," Current Biology, Apr. 23, 2018, 28(8):1224-1233.
McBeath et al., "How baseball outfielders determine where to run to catch fly balls," Science, Apr. 28, 1995, 268(5210):569-573.
Mnih et al, "Playing Atari with Deep Reinforcement Learning," CoRR, submitted on Dec. 19, 2013, arXiv:1312.5602, 9 pages.
Mnih et al., "Recurrent Models of Visual Attention," Paper, Presented at the 28th Conference on Neural Information Processing Systems, Montreal, Canada, Dec. 8-13, 2014; Advances in Neural Information Processing Systems, Dec. 2014, 27, 9 pages.
Modayil et al., "Multi-timescale nexting in a reinforcement learning robot," Adaptive Behavior, Feb. 7, 2014, 22(2):146-160.
Morimoto et al., "Acquisition of stand-up behavior by a real robot using hierarchical reinforcement learning," Robotics and Autonomous Systems, Jul. 31, 2001, 36(1):37-51.
Mott et al., "Towards Interpretable Reinforcement Learning Using Attention Augmented Agents," Paper, Presented at the 33rd Conference on Neural Information Processing Systems, Vancouver, Canada, Dec. 8-14, 2019; Advances in Neural Information Processing Systems, Dec. 2019, 32, 10 pages.
Nachum et al., "Data-efficient hierarchical reinforcement learning," Advances in Neural Information Processing Systems 31, 2018, 11 pages.
Narvekar et al., "Autonomous task sequencing for customized curriculum design in reinforcement learning," Proceedings of the Twenty-Sixth International Joint Conference on Artificial Intelligence, Aug. 19, 2017, pp. 2536-2542.
Nilsson et al., "Embodied Visual Active Learning for Semantic Segmentation," Paper, Presented at the The Thirty-Fifth AAAI Conference on Artificial Intelligence (AAAI-21), Virtual Event, Feb. 2-9, 2021, 35(3):2373-2383.
Pathak et al., "Curiosity-driven exploration by self-supervised prediction," Proceedings of the 34th International Conference on Machine Learning, Aug. 6-11, 2017, 70:2778-2787.
Perlin, "An Image Synthesizer," ACM SIGGRAPH Computer Graphics, Jul. 1985, 19(3):287-296.
Plappert et al., "Multi-Goal Reinforcement Learning: Challenging Robotics Environments and Request for Research," CoRR, Submitted Feb. 2018, arXiv:1802.09464v1, 16 pages.

(56) References Cited

OTHER PUBLICATIONS

Riedmiller et al., "Learning by playing solving sparse reward tasks from scratch," Proceedings of the 35th International Conference on Machine Learning, Jul. 10-15, 2018, 80:4344-4353.
Rivkind et al., "Visual Hyperacuity with Moving Sensor and Recurrent Neural Computations," Paper, Presented at the Proceedings of the International Conference on Learning Representations, Virtual Event, Apr. 25-29, 2022, 24 pages.
Salter et al., "Attention-Privileged Reinforcement Learning," Paper, Presented at the Proceedings of the 4th Conference on Robot Learning (CoRL 2020), Cambridge, Massachusetts, Nov. 16-18, 2020; PMLR, 2021, 155, 15 pages.
Shadowrobot.com [online], "Shadow Dexterous Hand™," available on or before Apr. 24, 2013, via Internet Archive: Wayback Machine URL <https://web.archive.org/web/20130424130222/http://www.shadowrobot.com/products/dexterous-hand/>, retrieved on Sep. 11, 2025, retrieved from URL <http://www.shadowrobot.com/products/dexterous-hand/>, 4 pages.
Sorokin et al., "Deep Attention Recurrent Q-Network," CoRR, Submitted Dec. 2015, arXiv:1512.01693v1, 7 pages.
Sutton et al., "Between MDPs and semi-MDPs: A framework for tem-poral abstraction in reinforcement learning," Artificial Intelligence, Aug. 1999, 112(1-2):181-211.
Sutton et al., "Horde: A scalable real-time architecture for learning knowledge from unsupervised sensorimotor inter-action," The 10th International Conference on Autonomous Agents and Multiagent Systems, May 2, 2011, 2:761-768.
Szot et al., "Habitat 2.0: Training home assistants to rearrange their habitat," Advances in Neural Information Processing Systems 34, 2021, 16 pages.
Todorov et al., "MuJoCo: A physics engine for model-based control," Paper, Presented at the Proceedings of the 2012 IEEE/RSJ International Conference on Intelligent Robots and Systems, Vilamoura-Algarve, Portugal, Oct. 7-12, 2012, pp. 5026-5033.
Vezhnevets et al., "Feudal networks for hierarchical reinforcement learning," Proceedings of the 34th International Conference on Machine Learning, 2017, 70:3540-3549.
White et al., "Surprise and curiosity for big data robotics," Workshops at the Twenty-Eighth AAAI Conference on Artificial Intelligence, 2014, pp. 19-23.
Wu et al., "Self-Supervised Attention-Aware Reinforcement Learning," Paper, Presented at the The Thirty-Fifth AAAI Conference on Artificial Intelligence (AAAI-21), Virtual Event, Feb. 2-9, 2021, 35(12):10311-10319.
Yang et al., "Embodied Amodal Recognition: Learning to Move to Perceive Objects," Paper, Presented at the 2019 IEEE/CVF International Conference on Computer Vision (ICCV), Seoul, Korea (South), Oct. 27-Nov. 2, 2019, pp. 2040-2050 (Author Manuscript).
Young et al., "Variable feedback experiments testing a sampled data model for eye tracking movements," IEEE Transactions on Human Factors in Electronics, Sep. 1963, (1):38-51.
Zaky et al., "Active Perception and Representation for Robotic Manipulation," CoRR, Mar. 15, 2020, arXiv:2003.06734v1, 8 pages.

* cited by examiner

TRAINING CAMERA POLICY NEURAL NETWORKS THROUGH SELF-PREDICTION

CROSS-REFERENCE TO RELATED APPLICATIONS

This application is a National Stage Application under 35 U.S.C. § 371 and claims the benefit of International Application No. PCT/EP2023/066186, filed Jun. 15, 2023, which claims priority to U.S. Provisional Application No. 63/352,633, filed on Jun. 15, 2022. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes techniques for training a camera policy neural network and using the trained camera policy neural network.

One example implementation described herein relates to a method for training a camera policy neural network. The camera policy neural network is used to control a position of a camera sensor in an environment being interacted with by a robot. The method comprises obtaining data specifying one or more target sensors of the robot; obtaining a first observation comprising one or more images of the environment captured by the camera sensor while at a current position; processing a camera policy input comprising (i) the data specifying one or more target sensors of the robot and (ii) the first observation that comprises one or more images captured by the camera sensor using the camera policy neural network to generate a camera policy output that defines a camera control action for adjusting the position of the camera sensor; adjusting the current position of the camera sensor based on the camera control action; obtaining a second observation comprising one or more images of the environment captured by the camera sensor while at the adjusted position; generating, from the second observation, a respective prediction for each of the one or more target sensors that characterizes sensor readings generated by the target sensor; generating, for each target sensor, a respective reward for the camera policy neural network from an error in the respective prediction for the target sensor; and training the camera policy neural network using the rewards for the one or more target sensors.

In this specification a "robot" can be a real-world, mechanical robot or a computer simulation of a real-world, mechanical robot. Thus, the camera policy neural network can be trained in either a real-world environment or a simulated environment, i.e., a computer simulation of a real-world environment. In some implementations, when the camera policy neural network is trained in a simulated environment, the trained camera policy neural network can be used for a downstream task in the real-world environment. For example, the trained camera policy neural network can be used as part of training a robot policy neural network for controlling the robot. Training the robot policy neural network can be performed in the real-world environment and, after training, the robot policy neural network can be used to control the real-world robot in the real-world environment. Alternatively, training the robot policy neural network can also be performed in the computer simulation and, after training, the robot policy neural network can be used to control the real-world robot in the real-world environment.

In some implementations, the camera sensor is part of the robot.

In some implementations, the camera sensor is external to the robot within the environment.

In some implementations, the camera sensor is a foveal camera.

In some implementations, the foveal camera comprises a plurality of cameras with different fields of view.

In some implementations, the respective prediction is a prediction of a value of a sensor reading of the target sensor at a time step at which the second observation is generated.

In some implementations, the respective prediction is a prediction of a return generated from at least values of sensor readings of the target sensor at each of one or more time steps after the time step at which the second observation is generated.

In some implementations, generating, from the second observation, a respective prediction for each of the one or more target sensors that characterizes sensor readings generated by the target sensor comprises: processing a predictor input comprising the second observation using a sensor prediction neural network to generate a predictor output comprising the respective predictions for each of the one or more target sensors.

In some implementations, the method further comprises: training the sensor prediction neural network using the errors in the respective predictions for the one or more target sensors.

In some implementations, the robot comprises a plurality of sensors that include the one or more target sensors, the predictor output comprises a respective prediction for each of the plurality of sensors, and training the sensor prediction neural network comprises training the sensor prediction neural network using errors in the respective predictions for each of the plurality of sensors.

In some implementations, the target sensors comprise one or more proprioceptive sensors of the robot.

In some implementations, the action specifies a target velocity for each of one or more actuators of the camera sensor.

In some implementations, training the camera policy neural network using the rewards for the one or more target sensors comprises training the camera policy neural network through reinforcement learning.

In some implementations, training the camera policy neural network through reinforcement learning comprises training the camera policy neural network jointly with a camera critic neural network.

In some implementations, the robot further comprises one or more controllable elements.

In some implementations, each of the controllable elements are controlled using a respective fixed policy during the training of the camera policy neural network.

In some implementations, during the training of the camera policy neural network, each of the controllable elements are controllable using a robot policy neural network that receives inputs comprising one or more images generated by the camera sensor.

In some implementations, the robot policy neural network is trained on external rewards for a specified task during the training of the camera policy neural network.

In some implementations, the training of the camera policy neural network is performed as an auxiliary task during the training of the robot policy neural network.

In some implementations, the method further comprises: after the training of the camera policy neural network: training, using the trained camera policy neural network, a robot policy neural network that receives inputs comprising one or more images generated by the camera sensor to control each of the one or more controllable elements using external rewards for one or more specified tasks.

In some implementations, training, using the trained camera policy neural network, a robot policy neural network that receives inputs comprising one or more images generated by the camera sensor to control each of the one or more controllable elements using external rewards for one or more specified tasks comprises: using the trained camera policy neural network to generate training data for the training of the robot policy neural network.

In some implementations, the one or more controllable elements comprise one or more manipulators.

Particular embodiments of the subject matter described in this specification can be implemented so as to realize one or more of the following advantages.

By training the camera policy neural network as described in this specification, the neural network learns active vision skills, for moving the camera to observe a robot's sensors from informative points of view, without external rewards or labels. In particular, the camera policy neural network learns to move the camera to points of view that are most predictive for a target sensor, which is specified using a conditioning input to the neural network. Even when the training uses a noisy learned reward function, the learned policies are competent, avoid occlusions, and precisely frame the sensor to a specific location in the view. That is, the learned policy learns to move the camera to avoid occlusions between the camera sensor and the target sensors and learns to frame the sensor to a location in the view that is most predictive of the sensor readings generated by the sensor.

Learning these active vision skills can be useful for any of a variety of downstream tasks. For example, learning to visually frame objects in a consistent image location actively reduces the image-space variance attributable to object position. Thus, locking down the object's position within the image could simplify learning downstream robotics skills, i.e., training policy neural networks for controlling robots to perform tasks or to learn reusable skills. For example, making use of the camera policy neural network (or a subnetwork of the neural network) can improve the acquisition of visually-guided manipulation policies, as they can then focus on the difficult-to-learn manipulation aspect of the policy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
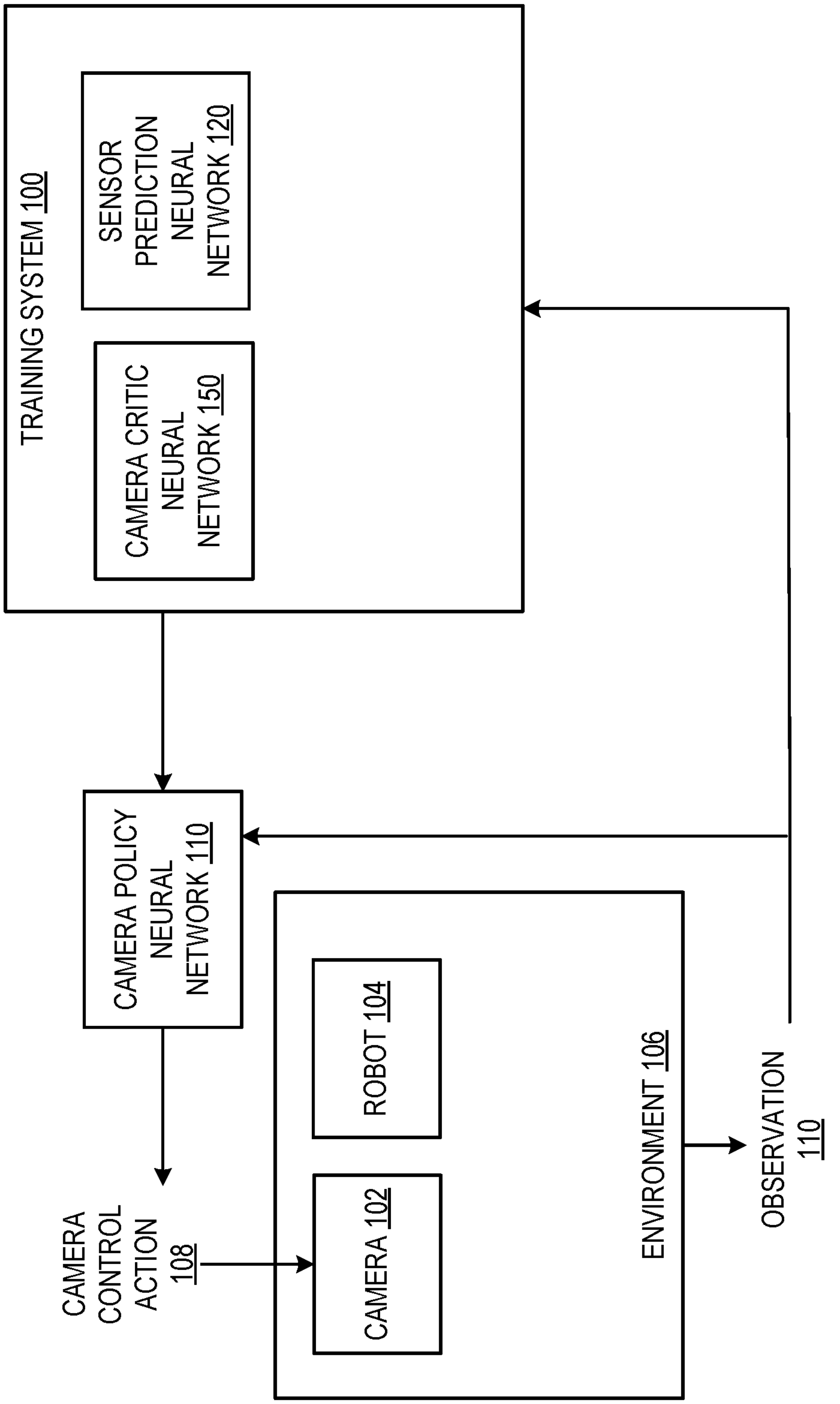
FIG. 1 shows an example training system.

FIG. 1 shows an example training system 100. The training system 100 is an example of a system implemented as computer programs on one or more computers in one or more locations in which the systems, components, and techniques described below are implemented.

The training system 100 trains a camera policy neural network 110 that controls the position of a camera sensor 102 in an environment 106 that includes a robot 104.

In this specification, the robot 104 can be a real-world, mechanical robot or a computer simulation of a real-world, mechanical robot. Thus, the camera policy neural network 110 can be trained in an environment 106 that is either a real-world environment or a simulated environment, i.e., a computer simulation of a real-world environment.

When the camera policy neural network 110 is trained in a simulated environment, after training, the camera policy neural network 110 can be used for a downstream task in the real-world environment. For example, the trained camera policy neural network 110 can be used as part of training a robot policy neural network for controlling the robot 104. This training of the robot policy neural network can also be performed in the real-world environment or in the computer simulation and, after training, the robot policy neural network can be used to control the real-world robot in the real-world environment. These downstream tasks are described in more detail below.

The robot 104 generally includes a set of sensors for sensing the environment 106, e.g., one or more of proprioceptive sensors; exteroceptive sensors, e.g., camera sensors, Lidar sensors, audio sensors, and so on; tactile sensors, and so on.

While this specification generally describes the sensors being sensors of a robot, the system 100 can be used to generate predictions for sensors for any appropriate type of agent that has sensors and that can move in the environment. That is, more generally, the robot 104 can be any appropriate type of agent. For example, when the environment 104 is a simulated environment, examples of other agent types can include simulated people or animals or other avatars that are equipped with sensors.

In particular, the camera policy neural network 110 receives an input that includes an observation 110, i.e., includes one or more images 108 captured by the camera sensor, and processes the input to generate a camera policy output 112 that defines a camera control action 114 for adjusting the position of the camera sensor 102.

In particular, the position of the camera sensor 102 can be adjusted by applying control inputs to one or more actuators and the camera policy output 112 can specify a respective control input to each of the one or more actuators of the camera sensor 102. As a particular example, the camera control action 114 can specify a target velocity for each of the one or more actuators of the camera sensor or a different type of control input for each of the one or more actuators.

The camera sensor 102 can be any of a variety of types of camera sensors. For example, the camera sensor 102 can be a foveal camera sensor. A foveal camera is one that produces images in which the image resolution varies across the image, i.e., is different in different parts of the image.

This foveal camera sensor can be implemented as a single, multiresolution hardware device or as a plurality of cameras with different fields of view.

When the environment is a computer simulation, the foveal images can be generated by rendering different areas of the field of view of the camera in different resolutions. For example, the "foveal area," i.e., the higher-resolution portion of the image, can be rendered in a higher resolution (consuming more computational responses to focus on it) whereas parts outside the foveal area could be rendered at a lower resolution (consuming fewer computational resources).

Alternatively, the camera sensor 102 can be a single, single-resolution camera device.

As will be described in more detail below, the input to the camera policy neural network 110 also identifies one or more target sensors of the robot 104, i.e., to guide the camera policy neural network 110 to focus the camera on the target sensor of the robot 104.

The robot 104 and the camera sensor 102 can be arranged in any of a variety of configurations within the environment 106.

For example, the camera sensor 102 can be part of the robot 104. That is, the camera sensor 102 can be attached to or embedded within the body of the robot 104. Thus, the one or more actuators that control the camera position are a subset of the actuators of the robot 104.

As another example, the camera sensor 102 can be external to the robot 104 within the environment 106. Thus, the one or more actuators that control the camera position are separate from the actuators of the robot 104.

In particular, the system 100 trains the camera policy neural network 104 so that the camera policy neural network 104 can effectively guide the camera sensor 102 to consistently lock in on the target sensor that is identified in the input to the neural network 104, even when the robot 104 (and therefore the target sensor) is changing position within the environment 106.

That is, during the training of the camera policy neural network 110, the system or another system controls the robot 104 to change position within the environment 106.

For example, the robot 104 can be controlled using a fixed policy, i.e., a fixed policy that is not being learned during the training. This policy can be, e.g., a random policy that randomly selects the control inputs to the robot 104 at any given time. As another example, the policy can be one that has already been learned and that maximizes the entropy of the target sensor(s). As another example, the robot 104 can be controlled using a policy that is being learned during the training of the camera policy neural network 110. For example, the policy that is being learned can be one that attempts to maximize the entropy of the target sensor(s).

In some implementations, the system 100 uses a sensor prediction neural network 120 as part of the training of the camera policy neural network 104.

The sensor prediction neural network 120 is configured to receive an input observation 110 that includes one or more images captured by the camera sensor and to generate a predictor output that includes a respective prediction for each sensor in at least a subset of the sensors of the robot 104.

The prediction for a given sensor can be any of a variety of different predictions that characterize the current or future state of the sensor.

In some implementations, the respective prediction is a prediction of a value of a sensor reading of the sensor at a time step at which the last image in the one or more images in the input is generated. A "time step" within a sequence of environment interactions, e.g., an episode, as will be described below, corresponds to the time at which the last image in the one or more images in a given observation is generated.

In some other implementations, the respective prediction is a prediction of a value of a sensor reading of the sensor at a next time step that immediately follows the time step at which the last image in the one or more images in the input is generated.

In some other implementations, the respective prediction is a prediction of a return generated from at least values of sensor readings of the target sensor at each of one or more time steps after the last image in the one or more images in the input is generated. A "return" is a sum or a time discounted sum of the values at the one or more time steps. For example, at a time step t, the return can satisfy:

$$\sum_i \gamma^{i-t-1} v_i,$$

where i ranges either over all of the time steps after t in an episode or for some fixed number of time steps after t within the episode, γ is a discount factor that is greater than zero and less than or equal to one, and $v_i$ is the value of the sensor at time step i.

In any of the above implementations, the output of the sensor prediction neural network 120 can directly regress the predicted value (or return) or can be the parameters of a discrete or continuous distribution over a set of possible values (or returns). That is, in some cases the sensor prediction neural network 120 can generate a distributional prediction that defines a distribution over a set of possible values (or returns). For example, the distribution can be a categorical distribution over possible values (or returns) and the output can provide the supports for the categorical distribution or the distribution can be any appropriate type of distribution and the output can specify the quantile function of the distribution.

For example, the system 100 can train the camera policy neural network 110 jointly with a camera critic neural network 150.

The camera critic neural network 150 is a neural network that receives an input that includes an observation that includes one or more images taken while the camera sensor 102 is at a particular position and a camera control action generated for a target sensor and generates as output a critic output that defines a predicted return for the target sensor if the camera control action is performed while the camera sensor is in the particular position. For example, the critic output can be a regressed return value or can specify parameters of a distribution over possible returns.

Generating predictions for sensors and training the camera policy neural network 110 is described in more detail below with reference to FIGS. 2A-4.

Once the system 100 has trained the camera policy neural network 110, the system 100 (or another, separate, system) can use the trained camera policy neural network 110 for any of a variety of purposes.

As a particular example, the system 100 can use the trained camera policy neural network 110 to train a robot policy neural network that controls the robot 104 to perform one or more specified tasks. The robot policy neural network receives inputs that include one or more images generated by the camera sensor and generates policy outputs for controlling the robot.

As a general example, the task(s) can include one or more of, e.g., navigating to a specified location in the environment, identifying a specific object in the environment, manipulating the specific object in a specified way, and so on.

That is, the robot 104 can have one or more controllable elements, e.g., one or more manipulators or other elements that can be controlled to cause parts of the body of the robot 104 to move within the environment.

As described above, in some implementations, each of the controllable elements are controlled using a respective fixed policy, e.g., a random policy, during the training of the camera policy neural network 110.

After the training of the camera policy neural network, the trained camera policy neural network can be used to train the robot policy neural network using external rewards for one or more specified tasks.

In some cases, the robot policy neural network can control both the camera sensor and the robot, e.g., when the camera sensor is mounted on the robot or, when the camera sensor is located remotely from the robot, by transmitting control signals to a control system that controls one or more actuators of the camera sensor.

In these cases, the trained camera policy neural network 110 can be used to generate training data for the training of the robot policy neural network, e.g., by controlling the camera to capture images that allow the robot policy neural network to explore the environment.

In some other cases, the robot policy neural network 110 can be used to control the robot 104 (or, when the camera sensor 102 is mounted on the robot, one or more other joints or other actuators of the robot 104 other than those that control the camera sensor 102) and the camera policy neural network 110 or, a subnetwork of the camera policy neural network 110 along with a downstream subnetwork, can be used to change the position of the camera sensor 102 during the training.

In some of these cases, the camera policy neural network 110 or the subnetwork of the camera policy neural network 110 can be trained, i.e., fine-tuned, along with the robot policy neural network. In others of these cases, the camera policy neural network 110 or the subnetwork of the camera policy neural network 110 is held fixed during the training of the robot policy neural network.

In some implementations, during this training, a learned or fixed controller can generate inputs to the camera policy neural network 110 (or the subnetwork) to cause the camera policy neural network 110 to move the camera to different positions. That is, the learned or fixed controller can identify the target sensor of the robot 104 to be provided as input to the neural network 110 at any given time step or can generate a different type of conditioning input to specify the target position of the camera sensor 102 in the environment 106.

In some other examples, however, during the training of the camera policy neural network, each of the controllable elements are controlled using the robot policy neural network.

In these examples, the robot policy neural network can be trained on external rewards for a specified task during the training of the camera policy neural network and the training of the camera policy neural network is performed as an auxiliary task during the training of the robot policy neural network, i.e., so that the robot can improve in performing the task both by virtue of the camera policy neural network generating more useful images and the robot policy neural network generating more useful policy outputs.

In any of the above cases, the robot policy neural network receives as input an observation that includes one or more observations captured by the camera sensor 102.

The robot policy neural network processes the input to generate a policy output that defines a policy for controlling the robot, i.e., that defines an action ("control input") to be performed by the robot from a set of actions. For example, the set of actions can include a fixed number of actions or can be a continuous action space.

In one example, the policy output may include a respective Q-value for each control input in a fixed set. The system can process the Q-values (e.g., using a soft-max function) to generate a respective probability value for each control input, which can be used to select the control input or can select the control input with the highest Q-value.

The Q value for a control input is an estimate of a "return" that would result from the agent performing the control input in response to the current observation and thereafter being controlled using control inputs generated by the controller.

A return refers to a cumulative measure of "rewards" received by the agent, for example, a time-discounted sum of rewards. The agent can receive a respective reward at each time step, where the reward is specified by a scalar numerical value and characterizes, e.g., a progress of the agent towards completing an assigned task.

In another example, the policy output may include a respective numerical probability value for each control input in the fixed set. The system can select the control input, e.g., by sampling a control input in accordance with the probability values, by selecting the control input with the highest probability value.

As another example, when the control input space is continuous the policy output can include parameters of a probability distribution over the continuous control input space. The system can then select a control input by sampling a control input from the probability distribution or by selecting the mean control input.

In some implementations, the environment is a real-world environment and the robot is a mechanical agent interacting with the real-world environment. For example, the robot may be a robot interacting with the environment to accomplish a goal, e.g., to locate an object of interest in the environment, to move an object of interest to a specified location in the environment, to physically manipulate an object of interest in the environment in a specified way, or to navigate to a specified destination in the environment.

In these implementations, the observations may optionally include, in addition to the camera sensor images, one or more object position data, and sensor data to capture observations as the agent interacts with the environment, for example sensor data from a distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, data obtained by one or more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

The observations can also include data characterizing the task, e.g., data specifying target states of the agent, e.g., target joint positions, velocities, forces or torques or higher-level states like coordinates of the agent or velocity of the agent, data specifying target states or locations or both of other objects in the environment, data specifying target locations in the environment, and so on.

The control inputs may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the control inputs can include for example, position, velocity, or force/torque/acceleration data for one or more joints of a robot or parts of another mechanical agent. Control inputs may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the control inputs may include actions to control navigation e.g. steering, and movement e.g., braking and/or acceleration of the vehicle.

In some implementations the environment is a simulated environment and the robot and the camera sensors are implemented as one or more computer programs interacting with the simulated environment.

Generally in the case of a simulated environment the observations may include simulated versions of one or more of the previously described observations or types of observations and the actions may include simulated versions of one or more of the previously described control inputs or types of control inputs. That is, the simulated environment is a computer simulation of the real-world environment and the agent is a computer simulation of the robot in the real-world environment.

In some cases, the system can be used to control the interactions of the agent with a simulated environment, and the system can train the parameters of the robot policy neural network (e.g., using reinforcement learning techniques) and the camera policy neural network based on the interactions of the agent with the simulated environment. After the neural networks are trained based on the interactions of the agent with a simulated environment, the agent can be deployed in a real-world environment, and the trained neural networks can be used to control the interactions of the agent with the real-world environment. Training the neural networks based on interactions of the agent with a simulated environment (i.e., instead of a real-world environment) can avoid wear-and-tear on the agent and can reduce the likelihood that, by performing poorly chosen actions, the agent can damage itself or aspects of its environment.

Alternatively, after the training, the camera policy neural network, the robot policy neural network, or both can continue to be used in the simulated environment, e.g., to control the simulated robot or other agent(s) in the simulated environment. As a particular example of this, the simulated environment may be integrated with or otherwise part of a video game or other software in which some agents are controlled by human users while others are controlled by a computer system. The camera policy neural network, the robot policy neural network, or both can be used as part of the control of the other agents.

Optionally, in any of the above implementations, the observation at any given time step may include data from a previous time step that may be beneficial in characterizing the environment, e.g., the action performed at the previous time step, the reward received at the previous time step, and so on.

Figure 2A:
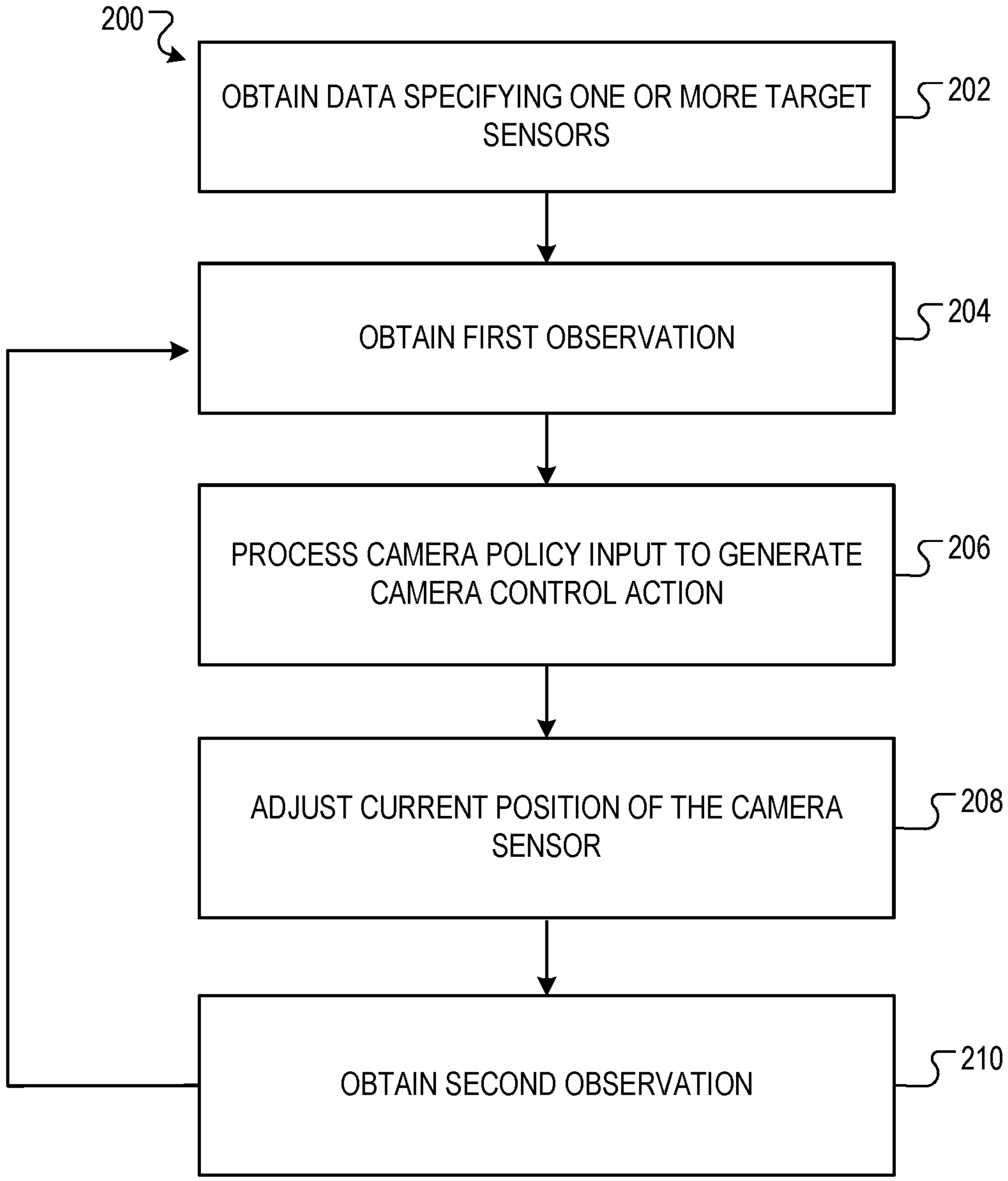
FIG. 2A is a flow diagram of an example process for generating training data for training the camera policy neural network.

FIG. 2A is a flow diagram of an example process 200 for generating training data for training the camera policy neural network. For convenience, the process 200 will be described as being performed by a system of one or more computers located in one or more locations. For example, a training system, e.g., the training system 100 of FIG. 1, appropriately programmed in accordance with this specification, can perform the process 200.

Generally, to train the camera policy neural network, the system can repeatedly perform episodes of control in order to generate training data for the camera policy neural network.

For each episode, the system obtains data specifying one or more target sensors of the robot (step 202). For example, for each episode, the system can select, e.g., randomly, one or more of the sensors of the robot to serve as the target sensor(s) for the episode. For example, the system can select, as target sensor(s), one or more proprioceptive sensors, exteroceptive sensors, or tactile sensors of the robot.

The system can then repeatedly perform steps 204-210 of the process 200 to generate training data for training the camera policy neural network, e.g., until termination criteria for the episode are met, e.g., a certain amount of time has elapsed or a certain amount of observations have been generated.

The system obtains a first observation that includes one or more images of the environment captured by the camera sensor while the camera sensor is at its current position (step 204). For example, the observation can include the two (or more) most recent images captured by the camera sensor.

The system processes a camera policy input that includes (i) data specifying the one or more target sensors of the robot and (ii) the first observation using the camera policy neural network to generate a camera policy output that defines a camera control action for adjusting the position of the camera sensor (step 206).

For example, the camera policy output can define a probability distribution over the space of camera control actions and the system can sample an action from the probability distribution or the camera policy output can directly be a regressed camera control action.

The system adjusts the current position of the camera sensor based on the camera control action (step 208). That is, the system causes the camera sensor to be moved in accordance with the camera control action. For example, the system can apply control inputs to the actuators of the camera to cause the actuators to reach the target velocities specified by the action.

The system obtains a second observation that includes one or more images of the environment captured by the camera sensor while at the adjusted position (step 210). That is, the observation includes one or more images captured by the camera after the camera has been moved according to the camera control action.

Thus, the system generates a training tuple that specifies the first observation, the action, and the second observation.

The system can then repeat the process 200, e.g., by using the "second" observation as the "first" observation for the next iteration of the process 200, until termination criteria for the episode have been satisfied, e.g., until a specified number of tuples have been generated or the environment reaches some termination state.

The system can then store the generated tuples in a memory, e.g., a replay memory. For example, multiple actor processes within the system can generate training tuples in parallel and store the generated tuples in the replay memory. In some cases, the replay memory has a fixed capacity and, during the training, probabilistically deletes tuples that have already been used for training to ensure that the fixed capacity is not exceeded.

Figure 2B:
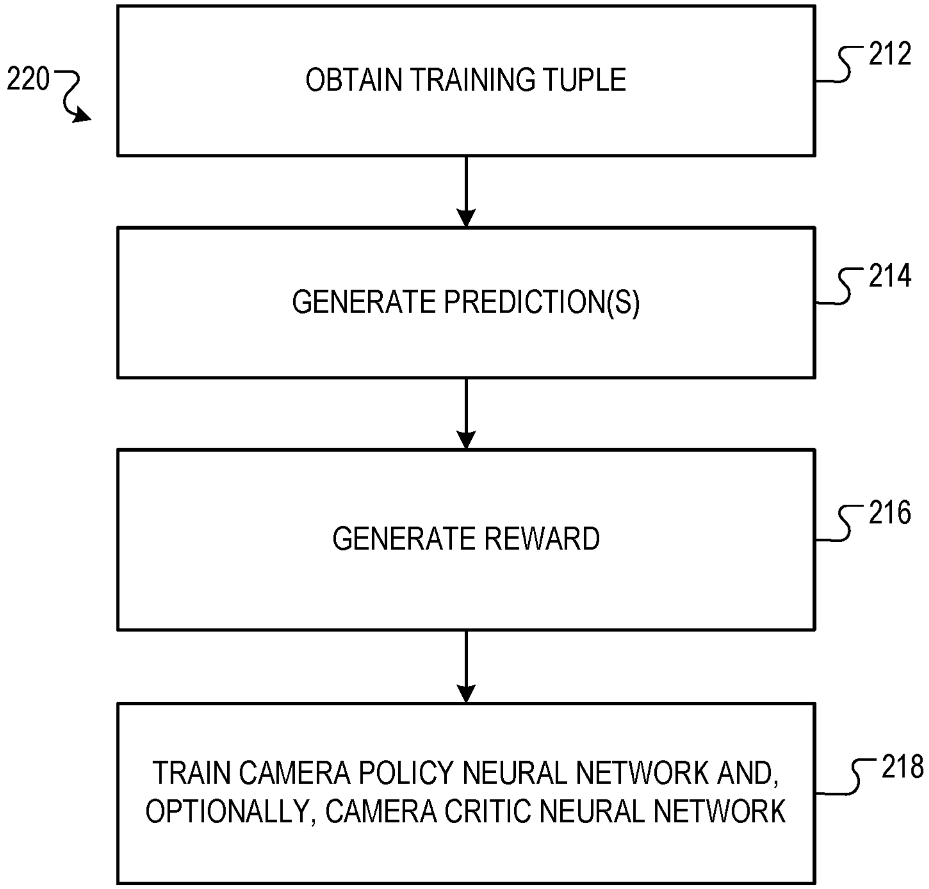
FIG. 2B is a flow diagram of an example process for training the camera policy neural network.

FIG. 2B is a flow diagram of an example process 220 for training the camera policy neural network. For convenience, the process 220 will be described as being performed by a system of one or more computers located in one or more locations. For example, a training system, e.g., the training system 100 of FIG. 1, appropriately programmed in accordance with this specification, can perform the process 220.

For example, a learner process within the system can repeatedly perform the process 220 on training tuples generated by one or more actor processes and obtained from a replay memory.

The system obtains a tuple that includes a first observation, a camera control action, and a second observation (step 212). For example, the system can sample the tuple from the replay memory, e.g., that has been generated by performing the process 200.

The system generates, from the second observation, a respective prediction for each of the one or more target sensors that characterizes sensor readings generated by the target sensor (step 214). That is, the system generates a respective prediction for each target sensor that was one of the target sensors when the camera policy neural network selected the camera control action.

As described above, the prediction for a given sensor can be generated by the sensor prediction neural network and can be any of a variety of different predictions that characterize the current or future state of the sensor. Thus, the system generates the prediction by processing the second observation using the sensor prediction neural network.

In some implementations, the respective prediction is a prediction of a value of a sensor reading of the sensor at a time step at which the last image in the one or more images in the input is generated.

In some other implementations, the respective prediction is a prediction of a value of a sensor reading of the sensor at a next time step that immediately follows the time step at which the last image in the one or more images in the input is generated.

In some other implementations, the respective prediction is a prediction of a return generated from at least values of sensor readings of the target sensor at each of one or more time steps after the time step at which the second observation is generated.

In any of the above implementations, the output of the sensor prediction neural network can directly regress the predicted value (or return) or can be the parameters of a discrete or continuous distribution over a set of possible values (or returns).

Generally, when the sensor prediction neural network is used, the sensor prediction neural network is trained jointly with the training of the camera policy neural network. Training the sensor prediction neural network is described in more detail below with reference to FIG. 3.

The system generates, for each target sensor, a respective reward for the camera policy neural network from an error in the respective prediction for the target sensor (step 216). Generally, the reward is higher when the error is lower, so that the camera policy neural network is rewarded for positioning the camera sensor so that accurate predictions are generated.

For example, when the respective prediction is a prediction of a value of a sensor reading of the sensor at a time step at which the last image in the one or more images in the input is generated, the system can determine the reward to be the negative of the error, e.g., a squared error, between the prediction and the ground truth value of the sensor reading of the sensor at the time step.

For example, when the respective prediction is a prediction of a value of a sensor reading of the sensor at the next time step, the system can determine the reward to be the negative of the error, e.g., a squared error, between the prediction and the ground truth value of the sensor reading of the sensor at the next time step.

For example, when the respective prediction is a prediction of the return, the system can determine the reward to be the negative of a temporal difference loss.

That is, the temporal difference loss is a loss between the prediction and a target prediction that is computed using (i) a discount factor, (ii) the ground truth value of the sensor at the next time step and (iii) a new prediction generated by the sensor prediction neural network at the next time step by processing the observation at the next time step, i.e., the second observation. When the prediction specifies a distribution, the temporal difference loss can be a distributional temporal difference loss that uses a distributional target prediction.

The system trains the camera policy neural network using the rewards for the one or more target sensors in the training tuple (step 218).

In particular, the system trains the camera policy neural network through reinforcement learning to generate actions that maximize expected returns that are computed from rewards for the one or more target sensors identified in the input to the camera policy neural network. As described above, the return is a sum or a time-discounted sum of future received rewards. For example, the return at time step t can satisfy:

$$\sum_i \gamma^{i-t-1} v_i,$$

where i ranges either over all of the time steps after t in an episode or for some fixed number of time steps after t within the episode, $\gamma$ is a discount factor that is greater than zero and less than or equal to one, and $r_i$ is the reward at time step i. The discount factor used to compute returns for the training of the camera policy neural network can be the same as or different from the discount factor used for the sensor prediction neural network.

Because the reward(s) for the target sensor(s) are dependent on the accuracy of the predictions generated based on images captured by the neural network, as a result of the training, the system trains camera policy neural network to generate images that accurately frame the target sensor(s) at positions within the viewpoint of the camera that allow predictions to be accurately generated.

For example, the system can train the camera policy neural network jointly with the camera critic neural network. Thus, the system trains the camera policy neural network and the camera critic neural network using the rewards.

As described above, the camera critic neural network is a neural network that receives an input that includes an observation that includes one or more images taken while the camera sensor is at a particular position and a camera control action generated for a target sensor and generates as output a critic output that defines a predicted return for the target sensor if the camera control action is performed while the camera sensor is in the particular position. For example, the critic output can be a regressed return value or can specify parameters of a distribution over possible returns. Examples of types of distributional outputs are described above with reference to the sensor prediction neural network.

The system can train the camera policy neural network jointly with the camera critic neural network using any appropriate actor-critic reinforcement learning technique, e.g., a deterministic policy gradient based technique or a distribution deterministic policy gradient based technique. Some examples of such techniques are described in Distributed Distributional Deterministic Policy Gradients, Barth-Maron, et al, arXiv:1804.08617.

Figure 3:
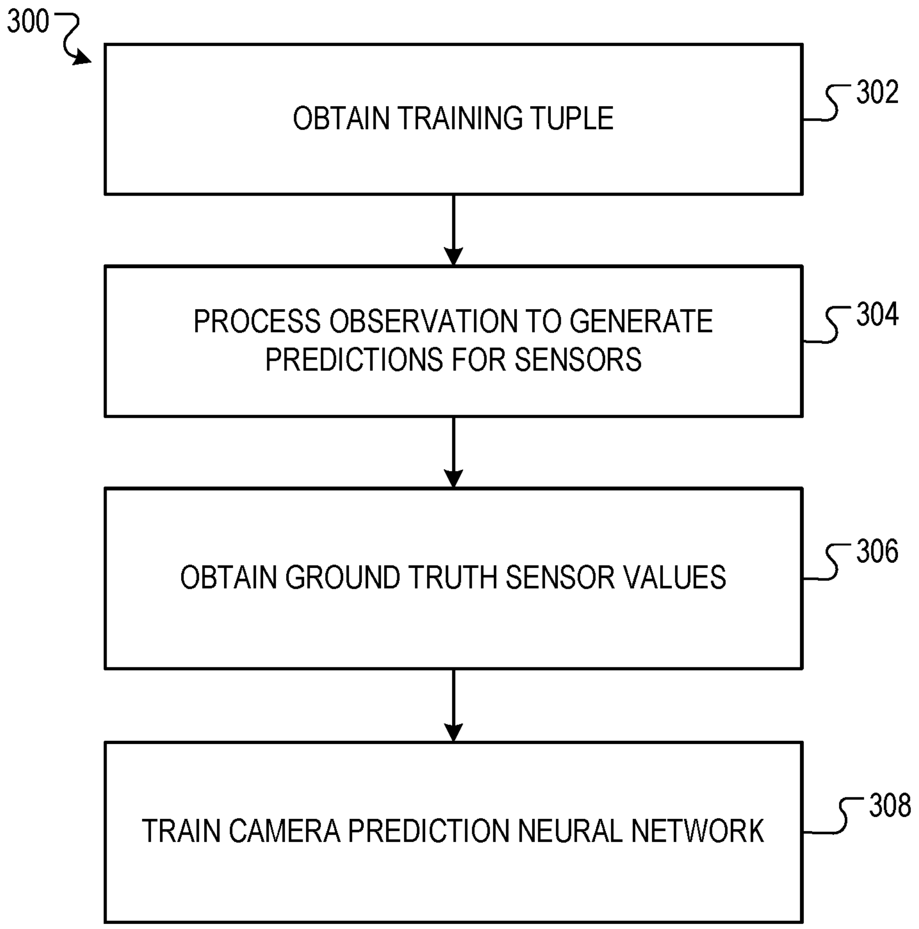
FIG. 3 is a flow diagram of an example process for training the sensor prediction neural network.

FIG. 3 is a flow diagram of an example process 300 for training the sensor prediction neural network. For convenience, the process 300 will be described as being performed by a system of one or more computers located in one or more locations. For example, a training system, e.g., the training system 100 of FIG. 1, appropriately programmed in accordance with this specification, can perform the process 200.

Generally, the system can generate training data for training the sensor prediction neural network during the same episodes of control as are performed to generate the training data for the camera policy neural network. Thus, the system can train the sensor prediction neural network using tuples generated for training the camera policy neural network.

The system obtains a training tuple (step 302), e.g., the same tuple sampled for training the camera policy neural network.

The system processes the images in the first observation in the tuple using the sensor prediction neural network to generate a respective prediction for each of a plurality of sensors of the robot (step 304).

As described above, the prediction for a given sensor can be any of a variety of different predictions that characterize the current or future state of the sensor.

In some implementations, the respective prediction is a prediction of a value of a sensor reading of the sensor at a time step at which the last image in the one or more images in the input is generated.

In some other implementations, the respective prediction is a prediction of a value of a sensor reading of the sensor at a next time step that immediately follows the time step at which the last image in the one or more images in the input is generated.

In some other implementations, the respective prediction is a prediction of a return generated from at least values of sensor readings of the target sensor at each of one or more time steps after the time step at which the second observation is generated.

The system obtains a respective ground truth value for each of the sensors (step 306). For example, when generating the tuple, the system can have stored the ground truth values for the sensors in the replay memory along with the training tuple.

For example, when the prediction is a prediction of a value of a sensor reading of the sensor at a time step at which the last image in the one or more images in the input is generated, the system obtains the actual value of the sensor reading at the time step.

When the respective prediction is a prediction of a value of a sensor reading of the sensor at the next time step or a prediction of the return, the system obtains the actual value of the sensor reading at the next time step.

The system trains the sensor prediction neural network using the ground truth values (step 308).

In particular, the system trains the neural network to minimize the errors in the predictions generated by the neural network.

For example, when the neural network predicts the current values or the next values, the system can train the neural network using a regression loss, e.g., a mean-squared error loss, that measures, for each sensor and for each training pair, the error between the prediction for the observation in the training pair and the ground truth value of the sensor reading in the training pair.

When the neural network predicts a return, the system can train the neural network on the training tuple by minimizing a loss that is a combination of, e.g., a sum of, temporal difference learning losses (or distributional temporal difference learning losses) for the sensors. Examples of temporal difference learning losses and distribution temporal difference learning losses are described in more detail in described in, for example, described in Playing Atari with Deep Reinforcement Learning, Mnih, et al, arXiv:1312.5602, Distributed Distributional Deterministic Policy Gradients, Barth-Maron, et al, arXiv:1804.08617, and so on.

FIGS. 2B and 3 describe the training of the sensor prediction neural network 120 and the camera policy neural network 110 when these neural networks are trained "off-policy," e.g., on training tuples sampled from a memory. In some other implementations, one or both of the neural networks can be trained on-policy, e.g., so that training tuples are directly used to train the neural network rather than being sampled from a memory.

Figure 4:
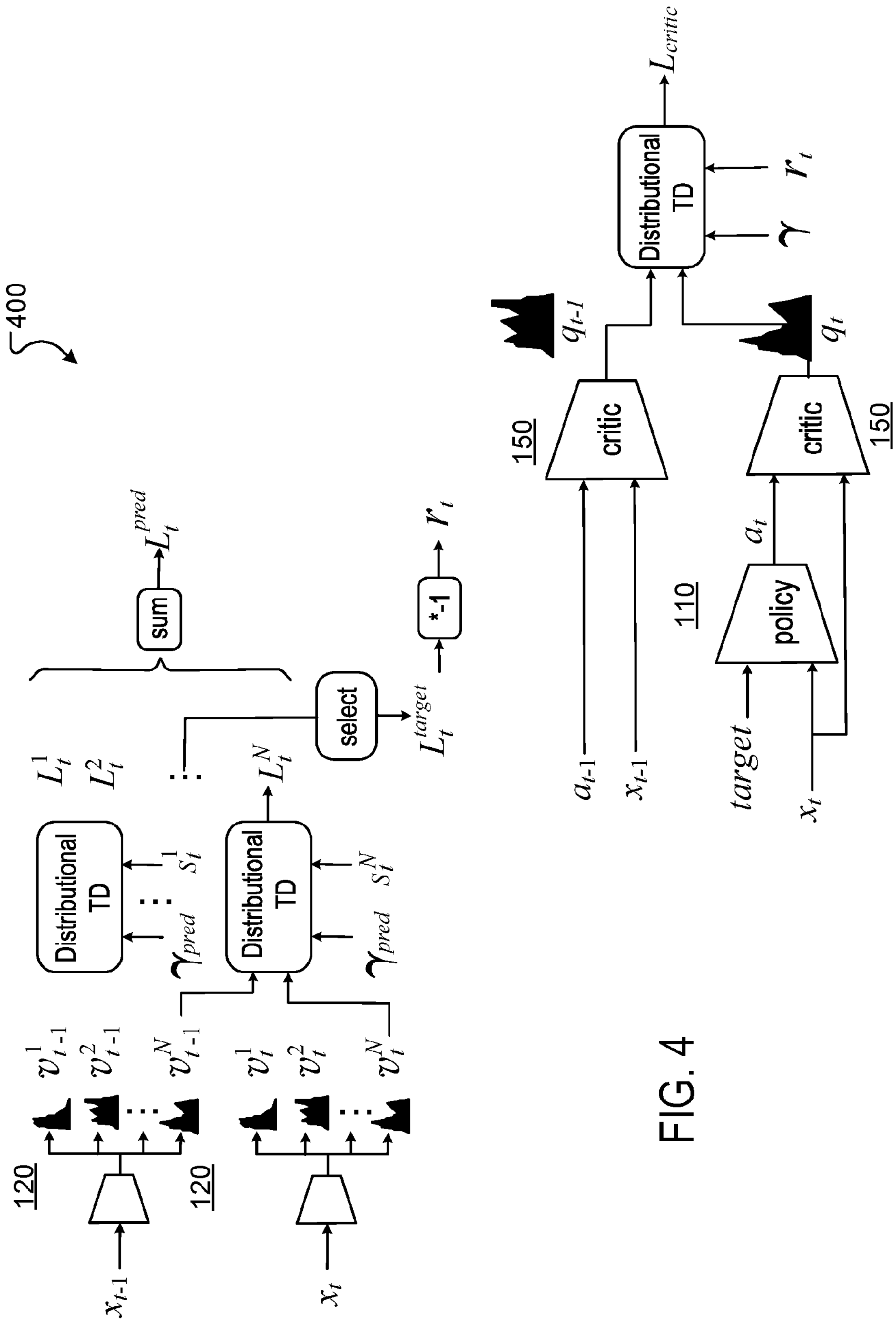
FIG. 4 shows an example of the training of the neural networks.

FIG. 4 shows an example of the training of the sensor prediction neural network 120 and the camera policy neural network 110.

As shown in the example of FIG. 4, when the sensor prediction neural network 120 generates an output that specifies a return computed from values of sensor readings, for any given training tuple, the system can use one of the temporal difference (TD) losses computed for the training of the sensor prediction neural network 120 on the training tuple to generate the reward for the training of the camera policy neural network 110 and the camera critic neural network 150.

In particular, the system can compute a respective TD loss for each of the sensors using the predictions of the sensor prediction neural network 120 for the sensors and the ground truth sensor values. The system can then select the TD loss for the target sensor, i.e., the sensor that was included in the input to the camera policy neural network 110 when the given training tuple was generated, and use the TD loss for the target sensor to generate the reward, e.g., by setting the reward equal to the negative of the TD loss.

In the example of FIG. 4, the sensor prediction neural network 120 is configured to generate an output that specifies a distribution over possible returns computed from values of sensor readings. Additionally, the camera policy neural network 110 is being trained jointly with a camera critic neural network 150 that generates a critic output that specifies a distribution over possible returns computed from rewards.

In particular, FIG. 4 shows the training of the neural networks on a tuple that specifies a first observation $x_{t-1}$, a second observation $x_t$, and a camera control action $a_{t-1}$ that was performed in response to the first observation $x_{t-1}$ and that the N sensors of the robot had respective actual sensor readings $s_t$ at time step t.

As shown in FIG. 4, the system computes a respective distributional temporal difference (TD) loss for each of the N sensors from, for each sensor, the actual sensor reading $s_t$ of the sensor at time step t, the distribution for the sensor at time step t−1, the discount factor for the sensor prediction training, and the distribution for the sensor at time step t.

The system then sums the respective distributional TD losses for the N sensors to generate a combined loss and trains the sensor prediction neural network 120 using the combined loss.

The system selects, as the reward $r_t$ for the camera control policy neural network 110 the negative of the distributional TD loss for the target sensor for the episode during which the first and second observations were received.

The system then uses this reward $r_t$ to train the camera policy neural network 110 and the camera critic neural network 150.

In particular, the system uses the reward $r_t$ to compute a distributional TD loss for the critic as shown in FIG. 4 and uses the critic loss to train the camera critic neural network 150.

The system also uses the camera critic neural network 150 to train the camera policy neural network 110 as part of the actor-critic reinforcement learning technique.

Table 1 shows the results of the described techniques (“ours”), in terms of the prediction accuracy of the sensor prediction neural network for various sensors after training (lower is better).

TABLE 1

| | Little finger touch | Forefinger root joint angle | Thumb root joint angle | Wrist flexion angle | Wrist deviation angle |
|---|---|---|---|---|---|
| Blind (c) | 0.680 ± 0.020 | 4.12 ± 0.065 | 4.11 ± 0.073 | 3.84 ± 0.059 | 4.08 ± 0.051 |
| Random (c) | 0.667 ± 0.067 | 4.16 ± 0.034 | 4.16 ± 0.056 | 3.51 ± 0.069 | 3.61 ± 0.050 |
| Random (f) | 0.648 ± 0.048 | 4.07 ± 0.033 | 4.09 ± 0.068 | 3.41 ± 0.054 | 3.58 ± 0.077 |
| Ours (c) | 0.582 ± 0.062 | 3.24 ± 0.070 | 2.98 ± 0.061 | 1.73 ± 0.054 | 2.17 ± 0.048 |
| Ours (f) | 0.606 ± 0.046 | 3.11 ± 0.050 | 2.75 ± 0.071 | 1.65 ± 0.047 | 1.93 ± 0.051 |
| Oracle (c) | 0.480 ± 0.020 | 2.80 ± 0.096 | 2.53 ± 0.025 | 1.45 ± 0.017 | 1.62 ± 0.026 |
| Oracle (f) | 0.587 ± 0.022 | 2.80 ± 0.030 | 2.53 ± 0.032 | 1.45 ± 0.009 | 1.66 ± 0.010 |

As can be seen from Table 1, the described technique performs significantly better than a “Blind” policy where the sensor prediction neural network cannot see the sensor, and a random policy where the position of the camera sensor is randomly selected both with conventional (“c”) camera sensors and foveal camera sensors (“f”). Additionally, the described techniques are comparable with an “oracle” technique that by design has visibility of the target sensors.

This specification uses the term “configured” in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term “data processing apparatus” refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

The invention claimed is:

1. A method for training a camera policy neural network that is used to control a position of a camera sensor in an environment being interacted with by a robot, the method comprising:

obtaining data specifying one or more target sensors of the robot;

obtaining a first observation comprising one or more images of the environment captured by the camera sensor while at a current position;

processing a camera policy input comprising (i) the data specifying one or more target sensors of the robot and (ii) the first observation that comprises one or more images captured by the camera sensor using the camera policy neural network to generate a camera policy output that defines a camera control action for adjusting the position of the camera sensor;

adjusting the current position of the camera sensor based on the camera control action;

obtaining a second observation comprising one or more images of the environment captured by the camera sensor while at the adjusted position;

generating, from the second observation, a respective prediction for each of the one or more target sensors that characterizes sensor readings generated by the target sensor;

generating, for each target sensor, a respective reward for the camera policy neural network from an error between the respective prediction for the target sensor and a respective ground truth value for the target sensor; and training the camera policy neural network using the rewards for the one or more target sensors.

2. The method of claim 1, wherein the camera sensor is part of the robot.

3. The method of claim 1, wherein the camera sensor is external to the robot within the environment.

4. The method of claim 1, wherein the camera sensor is a foveal camera.

5. The method of claim 4, wherein the foveal camera comprises a plurality of cameras with different fields of view.

6. The method of claim 1, wherein the respective prediction is a prediction of a value of a sensor reading of the target sensor at a time step at which the second observation is generated.

7. The method of claim 1, wherein the respective prediction is a prediction of a return generated from at least values of sensor readings of the target sensor at each of one or more time steps after the time step at which the second observation is generated.

8. The method of claim 1, wherein generating, from the second observation, a respective prediction for each of the one or more target sensors that characterizes sensor readings generated by the target sensor comprises:

processing a predictor input comprising the second observation using a sensor prediction neural network to generate a predictor output comprising the respective predictions for each of the one or more target sensors.

9. The method of claim 8, further comprising:

training the sensor prediction neural network using the errors between the respective predictions for the one or more target sensors and the respective ground truth values for the one or more target sensors.

10. The method of claim 9, wherein:

the robot comprises a plurality of sensors that include the one or more target sensors, the predictor output comprises a respective prediction for each of the plurality of sensors, and training the sensor prediction neural network comprises training the sensor prediction neural network using errors between the respective predictions for each of the plurality of sensors and respective ground truth values for the plurality of target sensors.

11. The method of claim 1, wherein the target sensors comprise one or more proprioceptive sensors of the robot.

12. The method of claim 1, wherein the action specifies a target velocity for each of one or more actuators of the camera sensor.

13. The method of claim 1, wherein training the camera policy neural network using the rewards for the one or more target sensors comprises training the camera policy neural network through reinforcement learning.

14. The method of claim 1, wherein training the camera policy neural network through reinforcement learning comprises training the camera policy neural network jointly with a camera critic neural network.

15. The method of claim 1, wherein the robot further comprises one or more controllable elements.

16. The method of claim 15, wherein each of the controllable elements are controlled using a respective fixed policy during the training of the camera policy neural network.

17. The method of claim 15, wherein, during the training of the camera policy neural network, each of the controllable elements are controllable using a robot policy neural network that receives inputs comprising one or more images generated by the camera sensor.

18. The method of claim 17, wherein the robot policy neural network is trained on external rewards for a specified task during the training of the camera policy neural network.

19. The method of claim 18, wherein the training of the camera policy neural network is performed as an auxiliary task during the training of the robot policy neural network.

20. The method of claim 15, further comprising:

after the training of the camera policy neural network:

training, using the trained camera policy neural network, a robot policy neural network that receives inputs comprising one or more images generated by the camera sensor to control each of the one or more controllable elements using external rewards for one or more specified tasks.

21. The method of claim 20, wherein training, using the trained camera policy neural network, a robot policy neural network that receives inputs comprising one or more images generated by the camera sensor to control each of the one or more controllable elements using external rewards for one or more specified tasks comprises:

using the trained camera policy neural network to generate training data for the training of the robot policy neural network.

22. The method of claim 15, wherein the one or more controllable elements comprise one or more manipulators.

23. A system comprising:

one or more computers; and one or more storage devices communicatively coupled to the one or more computers, wherein the one or more storage devices store instructions that, when executed by the one or more computers, cause the one or more computers to perform operations for training a camera policy neural network that is used to control a position of a camera sensor in an environment being interacted with by a robot, the operations comprising:

obtaining data specifying one or more target sensors of the robot;

obtaining a first observation comprising one or more images of the environment captured by the camera sensor while at a current position;

processing a camera policy input comprising (i) the data specifying one or more target sensors of the robot and (ii) the first observation that comprises one or more images captured by the camera sensor using the camera policy neural network to generate a camera policy output that defines a camera control action for adjusting the position of the camera sensor;

adjusting the current position of the camera sensor based on the camera control action;

obtaining a second observation comprising one or more images of the environment captured by the camera sensor while at the adjusted position;

generating, from the second observation, a respective prediction for each of the one or more target sensors that characterizes sensor readings generated by the target sensor;

generating, for each target sensor, a respective reward for the camera policy neural network from an error between the respective prediction for the target sensor and a respective ground truth value for the target sensor; and training the camera policy neural network using the rewards for the one or more target sensors.

24. One or more non-transitory computer storage media storing instructions that when executed by one or more computers cause the one or more computers to perform operations for training a camera policy neural network that is used to control a position of a camera sensor in an environment being interacted with by a robot, the operations comprising:

obtaining data specifying one or more target sensors of the robot;

obtaining a first observation comprising one or more images of the environment captured by the camera sensor while at a current position;

processing a camera policy input comprising (i) the data specifying one or more target sensors of the robot and (ii) the first observation that comprises one or more images captured by the camera sensor using the camera policy neural network to generate a camera policy output that defines a camera control action for adjusting the position of the camera sensor;

adjusting the current position of the camera sensor based on the camera control action;

obtaining a second observation comprising one or more images of the environment captured by the camera sensor while at the adjusted position;

generating, from the second observation, a respective prediction for each of the one or more target sensors that characterizes sensor readings generated by the target sensor;

generating, for each target sensor, a respective reward for the camera policy neural network from an error between the respective prediction for the target sensor and a respective ground truth value for the target sensor; and training the camera policy neural network using the rewards for the one or more target sensors.

* * * * *